Patented Nov. 5, 1929

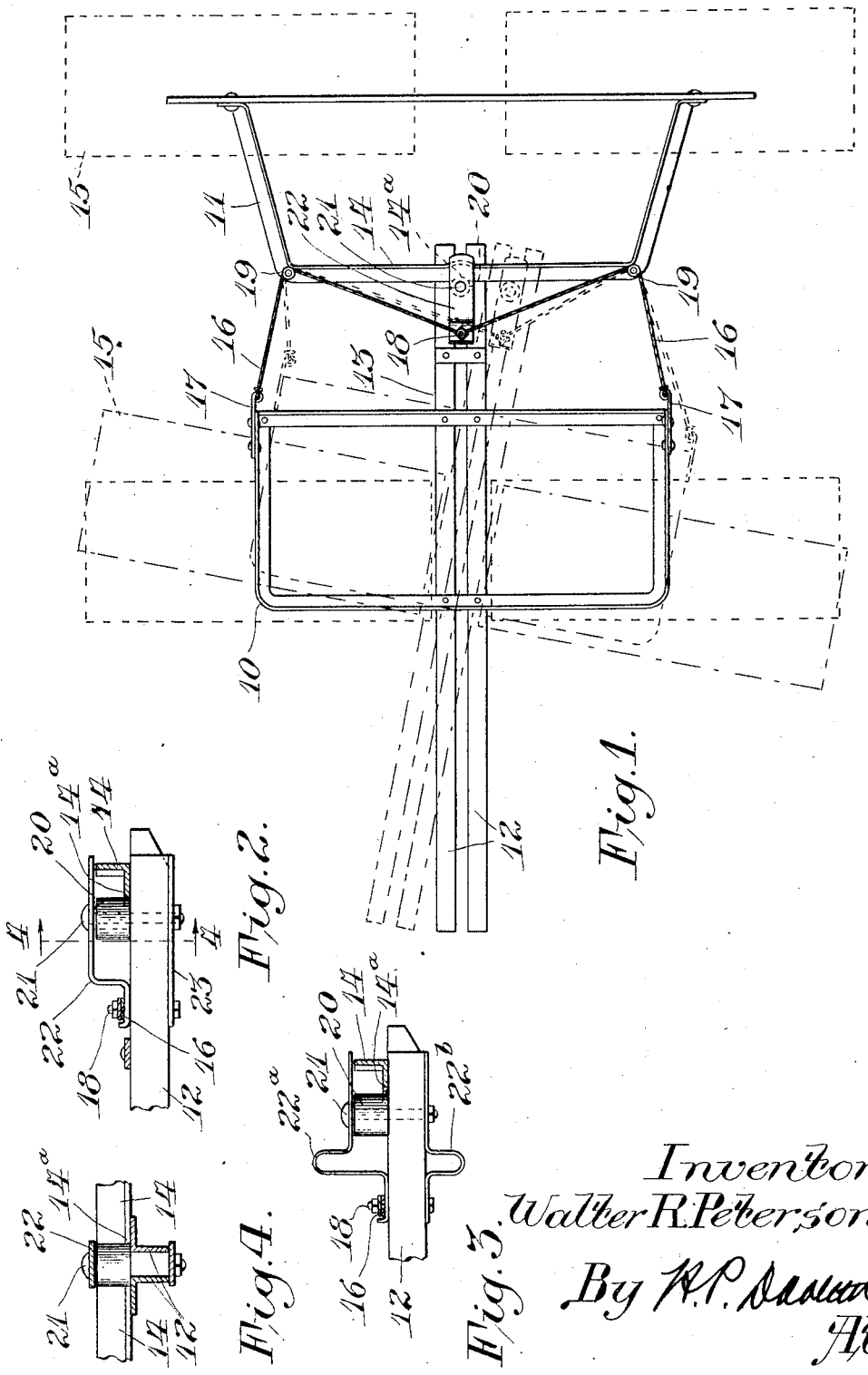

1,734,397

UNITED STATES PATENT OFFICE

WALTER R. PETERSON, OF PARK RIDGE, ILLINOIS, ASSIGNOR TO INTERNATIONAL HARVESTER COMPANY, A CORPORATION OF NEW JERSEY

DISK-HARROW FRAME

Application filed April 20, 1923. Serial No. 633,373.

This invention relates to flexible frame constructions for ground working implements of the tandem type. It is particularly directed to improvement in the coupling means for the front and rear frames of tandem or double disk harrows and the object of the invention is to provide a draft coupling between the frames that will hold them in substantially fixed trailing relation during straight forward travel and that will disengage and become a flexible coupling on turning to the right or left. This main and other minor objects are attained through the organization and details of construction constituting my invention as hereinafter set forth and claimed.

Referring to the drawings—

Fig. 1 is a plan view of a tandem harrow frame embodying my invention;

Fig. 2 is a detail side view of the frame locking device;

Fig. 3 is a similar view of a modified construction; and

Fig. 4 is a detail view on the line 4—4 of Fig. 2.

In the present instance my invention is illustrated as embodied in the frame construction of a double disk or tandem harrow comprising the front frame section 10 and rear frame section 11. The front section includes central forwardly extending members 12 constituting the draft tongue, these being extended rearwardly as at 13 to form a support for the forward transverse bar 14 of the rear frame 11. The frame sections 10 and 11 carry the usual pairs of pivoted disk gangs indicated in dotted lines at 15. The coupling mechanism between the front and rear sections is made up of flexible elements such as chains or cables 16. One of the cables is used on each side of the frame and each cable has its respective ends connected to a bracket 17 on the outer end of the front section and to a bolt or other securing element 18 on its rearward extension 13. Intermediate their ends, each of these cables of flexible elements 16 is passed over a draft element such as a sheave or roller 19 on the outer ends of the rear section and it will be evident that, with the construction so far described, a turn to either the right or left will result in movement of the cables 16 over the rollers 19 permitting the frame sections to assume the positions shown in dotted lines in Fig. 1, the draft being at all times transmitted through the outer corners of the respective sections. It is desirable, however, that when the implement is moving in a straight forward direction, the frame sections should be held in substantially fixed trailing relation to each other and, in order to provide for this, the transverse bar 14 on the rear section is formed with a central depression or notch 14ª and there is mounted on the rear end of the projection 13 a roller 20 which is supported in position to engage the depression 14ª when the two sections are in alignment, as best shown in Fig. 2. The roller 20 is mounted on a pintle or shaft 21 extending between the angle bars of the extension and supported in bracket members 22, 23 located on opposite sides of the frame extension 13 and connected by means of the bolt 18 which, in this instance, also serves as an anchoring means for the inner ends of the cables 16. The bracket members are preferably slidable on the frame extension, but may be fixed.

With the construction above described, it will be evident that the draft applied to the front frame section is transmitted through cables 16 to the rollers 19 on the rear section tending to retain roller 20 in the notch 14ª. In order to provide for possible stretching in the cable members 16 when the brackets 22, 23 are not slidably mounted, it is sometimes desirable to mount roller 20 so that it is resiliently pressed rearwardly. This may be done by means such as illustrated in Fig. 3 where the bracket members supporting the roller pintle 21 are composed of bowed spring members 22ª, 22ᵇ, which assures that the roller 20 will remain firmly seated in the notch 14ª. With either modification, when a turn is made, the roller 20 will be forced out of notch 14ª by the lateral force exerted by the extension 13 and will ride along bar 14 as shown in dotted lines on Fig. 1 and, upon resumption of straight forward travel, it will again seat in notch 14ª retaining the frame sections in substantially fixed trailing relation. A structure is thus provided which is flexible during a turn and substantially rigid, as to lateral sway, during forward travel, and one that assures proper trailing of the rear frame section under all conditions.

While the above exemplifies the preferred form of my invention, various modifications are contemplated within the scope of the following claims.

I claim as my invention:

1. A frame construction for tandem implements comprising front and rear sections, supporting means on the front section for the front portion of the rear section, draft elements on the outer portions of the rear sections, and coupling means between the sections comprising flexible elements having their respective ends attached to the outer portions of the front section and to the central portion thereof and having their intermediate portions movable over the draft elements on the rear section.

2. A frame construction for tandem implements comprising a front section, a rear section, one of said sections being provided with a central extension which engages a portion of the other section, draft elements on the outer portions of the section which the extension engages, and coupling means between the sections comprising cables having their respective ends attached to the outer portions of the section provided with the extension and to said extension and having their intermediate portions passing over the draft elements on the outer portions of the other section.

3. A frame construction for tandem implements comprising a front frame section and a rear frame section, flexible draft elements connected to the front section and engaging the outer portions of the rear sections, and means disengaged by a turning movement of the front section for retaining said sections in fixed trailing relation comprising a transverse member on the rear section provided with a central depression, and a rearward projection on the front section engaging said transverse member and having means thereon for engaging said depression.

4. A frame construction for tandem implements comprising front and rear sections, rollers pivoted on the outer portions of one section, flexible draft elements having their respective ends attached to the outer portions of the other section and to the central portion thereof and having their intermediate portions passing over said rollers, an extension on the section to which the draft elements are attached engaging the other section, and cooperating means on said extension and the engaged section for normally retaining the sections in fixed trailing relation.

5. A frame construction for tandem implements comprising a front frame section and a rear section, flexible draft elements connected to the front section and engaging the outer portion of the rear section, and means for normally retaining said frame sections in fixed trailing relation comprising a transverse bar on the rear section provided with a central seat and a rearward extension of the front section engaging said bar, a roller mounted for movement with respect to said extension and adapted to engage said seat when the sections are in alignment, and means pressing the roller rearwardly against the seat.

6. A frame construction for tandem implements comprising front and rear sections, supporting means on the front section for the front portion of the rear section, draft elements on the outer portions of the rear sections, coupling means between the sections comprising flexible elements having their respective ends attached to the outer portions of the front section and at a central point thereon, and having their intermediate portions movable over the draft elements on the rear section, and means disengaged by a turn for normally retaining said sections in fixed trailing relation.

7. In a frame construction for tandem implements, a front frame, a rear frame, means secured on the front frame for supporting the front part of the rear frame, flexible draft means between the front frame and the outer ends of the rear frame, and a retaining device engaged by said draft means for normally holding the front and rear frames in fixed trailing relation during straight-ahead travel, said retaining device being disengaged by the angling of the front frame on the turns.

In testimony whereof I affix my signature.

WALTER R. PETERSON.